United States Patent Office 3,274,163
Patented Sept. 20, 1966

3,274,163
PRODUCTION OF POLYCHLOROESTERS CONTAINING MONOFUNCTIONAL HALOGENATED ALCOHOLS
Gunther Elfers, Grosse Ile, and Pauls Davis, Gibraltar, Mich., assignors to Wyandotte Chemicals Corporation, Wyandotte, Mich., a corporation of Michigan
No Drawing. Filed Dec. 28, 1964, Ser. No. 421,667
56 Claims. (Cl. 260—78.4)

The present invention relates to polyesters and is more particularly concerned with halogenous polyesters having increased chemical and fire resistance and which are particularly useful in the preparation of more complex polyester-based compositions, which have a relatively high order of nonflammability, and which in many cases are nonburning as well as self-extinguishing.

The commercial potentialities of polyesters and related polymeric materials based on polyesters were recognized during the 1930's and especially during the Second World War. The ultrahigh strength properties of many of these compositions, combined with their light weight and durability, made them successful competitors in many applications with more conventional structural materials such as steel and aluminum. Polyester-based materials proved to be especially valuable. It was found that polyesters containing ethylenic unsaturation could be successfully copolymerized with unsaturated monomers to give hard, durable plastics, with wide variations in properties possible by varying the proportions and identity of the initial reactants. Such polyesters could be applied on a surface and air-dried to give tough, elastic, weather-resistant coatings. They could also be applied to reinforcing material, such as glass fiber, to give strong structural materials. When polyesters were used as intermediates with compounds containing functional groups capable of reacting with hydroxy or carboxy groups of the polyester, for instance isocyanates, a wide variety of products could be obtained ranging from soft and flexible to hard and brittle plastics, elastomers and foams.

However, in spite of the excellent physical and chemical properties of such polyester-based compositions, it was also found that they possess a major disadvantage, and consequently a factor which limits the area of their potential use: they are flammable and burn readily. Safety requirements, as imposed by insurance underwriters and civic ordinances, dictate that materials more resistant to fire be used.

It is a purpose of this invention to provide a new and useful class of halogenous polyesters which are thermally stable, which tend to polymerize completely, exhibit improved thermal properties, which are prepared from commercially available materials, which are relatively inexpensive, and which are useful as intermediates in the preparation of polymeric compositions which have a relatively high order of nonflammability, which in many cases are nonburning and which compositions may be cross-linked and to provide new and useful reaction products of such polyesters with isocyanates or acid chlorides.

It has now been found that the foregoing and additional purposes are accomplished by reacting one or more dicarboxylic acid anhydrides with one or more alkylene oxides, which may be halogenous alkylene oxides or mixtures of halogenous alkylene oxide with nonhalogenous alkylene oxide, which is preferably saturated or free from other than aromatic unsaturation and a halogenated monofunctional alcohol having the following general formula:

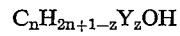

wherein $n$ is an integer of from 1 to 11, $z$ is an integer from 1 to 23 and Y is a halogen.

Essentially, the alkylene oxide reacts with the dibasic anhydride to give a polymer chain comprising alternating dicarboxy and oxyalkylene units, one or two or more of such oxyalkylene units being joined in the polymer chain depending on the reactants and ratio of reactants, said polymer chain being terminated by a halogenous monofunctional alcohol. Thus, the preferred polymeric products of the invention may, in general, be depicted by the formula:

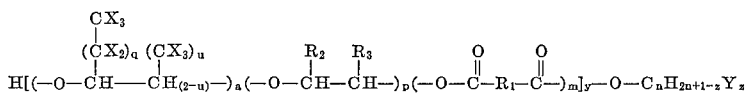

wherein $R_1$ is the residue of the dibasic anhydride, $R_2$ and $R_3$ are aliphatic or aromatic radicals or hydrogen, Y is a halogen, X is hydrogen or halogen, $q$ and $u$ are 0 or 1, $m$ is a small whole number usually 1, $y$ is a whole number usually from 1 to 50, $n$ is a small whole number usually from 1 to 11, $z$ is a whole number usually from 1 to 23 and $a$ and $p$ are either 0 or a small whole number usually 0 to 3. These polyesters may be further reacted with other materials, such as isocyanates and acid chlorides to produce additional new and useful products.

When they contain ethylenic unsaturation, these polyesters can be cross-linked with unsaturated monomers to give hard plastics which have physical properties comparable or superior to those of commercially available polyester plastics, superior chemical stability as compared with many commercial polyester plastics, and which are often nonburning. These are thermally stable halogen-containing compounds which are prepared from commercially available and relatively inexpensive materials and which are less sensitive to gelation than the prior art compounds when an aluminum alkoxide catalyst is used. The stoichiometrically proportioned monomers from which they are prepared polymerize completely so that removal of excessive monomers can be omitted.

The reaction may be carried out by merely heating and reacting the alkylene oxide with the starting organic carboxy compound and the halogenated monofunctional alcohol but is preferably conducted in the presence of a reaction catalyst, preferably Friedel-Crafts type catalysts. These include anhydrous aluminum chloride, antimony pentachloride, stannic chloride, ferric chloride, etc., as well as various halide analogs of the compounds, and their alkoxides. Additional catalysts include boron trifluoride, the formates of zinc, aluminum, and tin, litharge, tertiary amines, etc. The preferred catalyst depends on the individual reaction, and a catalyst effective for one particular system may be relatively inefficient with a different system, or even for different proportions of the same reactants. For example, aluminum chloride is particularly active in the reaction between 3,3,3-trichloropropylene oxide and maleic anhydride. Also, aluminum salts of carboxylic acids and phenols are active catalysts. Examples are aluminum phthalate, aluminum benzoate, aluminum acetate, aluminum phenolate.

Only small amounts of the more active catalysts, such as aluminum chloride and stannic chloride, are needed to effect a substantially complete reaction in a short time. Satisfactory results are ordinarily obtained with catalyst concentrations of from a few tenths of 1 percent to 1 percent or more, based on the total weight of the reactants, depending on the particular catalyst and reactants. If desired, more or less than this amount may be used, even up to a relatively uneconomic 10 percent by weight of reactants. Thus, the catalyst can be employed in a range of from about 0.01 percent to 10 percent by weight but preferably from 0.1 percent to 0.5 percent by weight of the total reaction mixture.

The catalyst may be used in its isolated form, or it may be suspended in a diluent or dissolved in a solvent. It is generally preferred to use a solventless system whenever possible since solvents are frequently difficult to remove from the product, making them economically undesirable, and they may also adversely influence the reaction and tend to discolor the product. The reaction may also be conducted in the absence of catalyst. However, this procedure has the disadvantage of low yields and, when strong heating is employed, frequently discolored products, as well as an uneconomically long reaction time, and is therefore not preferred.

Both halogenated and nonhalogenated alkylene oxides as well as mixtures of halogenated and nonhalogenated alkylene oxides can be employed for the reaction with the dicarboxylic or dibasic anhydrides and halogenated alcohols. The halogenated alkylene oxides used to prepare the polyesters of the present invention are vicinal alkylene oxides containing 3 to 4 carbon atoms, having 1 or 2 alkyl groups attached to at least 1 of the carbon atoms of the oxirane ring, said alkyl groups having up to 2 carbon atoms. Representative halogenated alkylene oxides are 3-chloro-1,2-epoxypropane,
3,3-dichloro-1,2-epoxypropane,
3,3,3-trichloro-1,2-epoxypropane,
3,3,3-trifluoro-1,2-epoxypropane,
3-bromo-3,3-dichloro-1,2-epoxypropane, other mixed 3,3,3-trihalo-1,2-epoxypropanes,
4,4,4-trichloro-1,2-epoxybutane,
3,3-difluoro-3-chloro-1,2-epoxypropane,
3,3-dichloro-3-fluoro-1,2-epoxypropane,
4,4,4-tribromo-1,2-epoxybutane,
3,3-difluoro-3-chloro-1,2-epoxypropane,
3,3-dichloro-3-fluoro-1,2-epoxypropane,
4,4,4-tribromo-1,2-epoxybutane,
3,4-dibromo-1,2-epoxybutane,
4,4,4,3,3-pentachloro-1,2-epoxybutane,
4,4,4,3,3-pentafluoro-1,2-epoxybutane,
4,4,4,3,3 mixed pentahalo-1,2-epoxybutanes,
1,1,1-trichloro-2,3-epoxybutane,
1,1,1,4,4,4-hexachloro-2,3-epoxybutane.

The nonhalogenated alkylene oxides, which can replace a portion or all of the halogenated alkylene oxides in their reaction with dicarboxylic acid anhydrides and halogenated alcohols, can contain 2 to 18 carbon atoms and comprise aliphatic as well as aromatic epoxides. Representative of this group are ethylene oxide, propylene oxide, 1,2-butylene oxide, 2,3-butylene oxide, 1,2-dodecylene oxide, 1,2-hexylene oxide, styrene oxide, methylstyrene oxide, methylglycidylether, phenylglycidylether, etc.

When the halogenous alkylene oxides react, the oxirane ring is opened with the breaking of an oxygen-carbon bond to give a bivalent unit wherein the members of the oxirane ring form a bivalent linear chain having the polyhalogenous lower-alkyl group, originally attached to a carbon atom of the oxirane ring, as a pendant group. By its reaction with the anhydride, this bivalent unit is bonded through the two free valences to other components of the polyester, thereby locating it in and along the polyester chain as a polyhaloalkyl-oxyalkylene group or radical and building the polyhalogeneous lower-alkyl group into the polyester as an exo-substituent. The bivalent oxyalkylene radical may be bonded through both valences by way of ester linkages to acid radicals, or it may be bonded through one or both valences to additional oxyalkylene radicals to form a polyoxyalkylene chain. The average length of the oxyalkylene chains forming a polyether moiety in the polyester chain is determined by the precise reactants, the reaction time, and ratio of reactants, as will be apparent to one skilled in the art.

The starting anhydride compounds of the present invention are dibasic organic acid anhydrides and preferably contain up to and including 12 carbon atoms.

Representative examples of the unsaturated dicarboxylic acid anhydrides are maleic anhydride, chloromaleic anhydride, itaconic anhydride, citraconic anhydride and the like. Examples representing the saturated dicarboxylic anhydrides are malonic anhydride, succinic anhydride, glutaric anhydride, adipic anhydride, phthalic anhydride, tetrahydrophthalic anhydride, hexachloroendomethylene tetrahydrophthalic anhydride, etc. Also, anhydrides of polycarboxylic acids can be utilized, like e.g., pyromellitic anhydride. Dicarboxylic acid anhydrides with and without olefinic unsaturation can be employed mixed in any proportion. However, a certain minimum proportion of unsaturated dicarboxylic acid anhydrides is necessary to provide sufficient unsaturated sites in case subsequent cross-linking with a vinyl monomer is desired. At least 40 percent, and preferably 60 percent, unsaturated dicarboxylic acid anhydrides is considered as the minimum proportion for such use.

The halogenated monofunctional alcohols of the general formula:

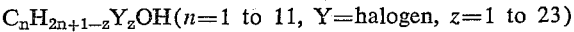

$C_nH_{2n+1-z}Y_zOH$ ($n=1$ to 11, Y=halogen, $z=1$ to 23)

can be employed for the reaction with dicarboxylic anhydrides and epoxides and comprise halogenated aliphatic primary, secondary and tertiary alcohols. Representative examples of this class of halogenated alcohols are 2,2-dichloroethanol,
2,2,2-trichloroethanol,
2,2,2-trifluoroethanol,
1,1-dichloro-2-propanol,
1,1,3-trichloro-2-propanol,
1,1,1-trichloro-2-propanol,
1,1,1,3-tetrachloro-2-propanol,
1,1,3,3-tetrachloro-2-propanol,
1,1,1,3,3-pentachloro-2-propanol,
1-bromo-1,1-dichloro-2-propanol,
1,1-dibromo-2-propanol,
1,1,1-tribromo-2-propanol,
1,1-dibromo-3-chloro-2-propanol,
1,1,1-tribromo-3-chloro-2-propanol,
1,1,1-trifluoro-3-chloro-2-propanol,
1,1,1-trifluoro-2-propanol,
1,3-dibromo-2-propanol,
2,2,3,3-tetrafluoro-1-propanol,
2,2,3,3,3-pentafluoro-1-propanol,
2,3-dibromo-1-propanol,
2,3-dichloro-1-propanol,
2,2,3,3,4,4,4-heptafluoro-1-butanol, and
1,1,1-trichloro-2-methyl-2-propanol.

Any halogen or combination of halogens may be present in the starting halogenous alkylene oxides or in the halogenated monofunctional alcohols. Of the halogens chlorine, fluorine and bromine are preferred and the halogen therefore has an atomic weight of 19 to 80 inclusive.

The properties and structure of the polyesters may be varied by using mixtures of alkylene oxides, such as two or more halogenous alkylene oxides together, two or more nonhalogenous alkylene oxides, or one or more polyhalogenous alkylene oxides with one or more mono- or nonhalogenous alkylene oxides. The use of such mixed oxides has the effect of minimizing the crystallinity of the polymer, and generally results in a more flexible product when the polyester is further reacted. By controlling the order of addition of these combinations of alkylene oxides, it is moreover possible to tailor the polymer. In general, the higher the halogen content incorporated into the polyester, the better the overall fire resistance and chemical resistance of the polyester products.

The polyesters are generally formed by heating and reacting the alkylene oxide with the starting organic dicarboxy anhydride and the halogenated alcohol as well as other reactants, if any, preferably in the presence of a suitable reaction catalyst at an elevated temperature ranging from 75° C. to the reflux temperature of the alkylene oxide or higher. In general, a temperature range between 110° C. and 140° C. is preferred.

Any of several different general procedures may be used in carrying out the reaction between the starting alkylene oxide, the dicarboxy compound and the halogenated alcohol. The oxide, dicarboxy compound, halogenated alcohol and reaction catalyst, if any, can all be mixed at once and the reaction mixture heated to the desired temperature range. The reaction between the alkylene oxide, dicarboxy compound and halogenated alcohol is exothermic at reaction temperature so that considerable heat may evolve and maintain the desired temperature for a period without additional external heating and may even require external cooling.

It is possible to take advantage of the exothermic heat of reaction by adding one or more of the reactants to the reaction mixture portionwise, preferably the alkylene oxide at such a rate that the desired reaction temperature is maintained. Once the initial polymerization stage has been completed, as indicated by the cessation of refluxing when a solventless reaction is conducted at the reflux temperature of the reaction mixture, the reaction mixture is heated for an additional period to drive the reaction to completion and to effect the desired degree of polymerization. The procedure may be the same whether one or more halogenous alkylene oxides or mixtures with nonhalogenous alkylene oxides are employed as starting material or whether one or more saturated or unsaturated dicarboxylic compounds or mixtures thereof are employed as starting materials.

The catalyst may be added to a mixture of all the reactants at once or it may be initially reacted or mixed with the dicarboxy compound or mixture of dicarboxy compounds.

The time necessary to react the alkylene oxide, anhydride and halogenated alcohol can vary between 30 minutes and 7 hours and depends on the catalyst employed. The reaction is considered complete when there are no volatiles left in the reaction mixture or when the amount of volatiles in the reaction mixture levels off to a constant minimum.

Although other procedures may be used, the reaction is advantageously carried out in a polymerization or other type reaction container fitted with condensing and stirring apparatus, a temperature recording and reading device and a heat source.

In the formation of the polyesters of the present invention, it is possible to vary the proportions of alkylene oxide, dicarboxy compound and halogenated alcohols over a considerable range. The polyesters so formed are of somewhat varied character. The proportions control the chemical and physical properties of the polyester, such as consistency, color, molecular weight, hydroxyl content, and halogen content as well as the properties of a cured polyester prepared therefrom such as heat distortion temperature. Accordingly, the preferred range in an individual case depends on a number of factors, including intended use of the polyester, properties desired in both the polyester itself and in compositions based on the polyester, the exact reactants employed, etc. In general, it is preferred to employ equal molar amounts of the alkylene oxide and dicarboxylic acid anhydride and to vary the mole ratio of the halogenated alcohol to the alkylene oxide or dicarboxylic acid anhydride from about 1:1 to 1:50 with the preferred range being from 1:2 to 1:12. Although the preferred proportion of alkylene oxide to dicarboxylic acid anhydride is 1:1, this proportion can be varied between 6:1 and 1:1.

Polymers prepared from maleic anhydride, 3,3,3-trichloropropylene oxide and 1,1,1,3,3-pentachloroisopropanol, especially in the presence of an aluminum isopropoxide or aluminum phthalate catalyst, are of particular interest and value and therefore represent preferred embodiments of the invention.

The polyester compounds of the present invention are soluble in most organic polar and nonpolar solvents, with the notable exception, in most cases, of diethylether and water, as well as in many monomers, including styrene, butyl methacrylate, triallylisocyanurate, diallylphthalate, etc. The polyesters have been found to be compatible in nearly any ratio with standard polyester resins. Because of these solubilities, it is frequently convenient to mix the polyester with further reactants and/or standard polyesters with which they are to be reacted or coreacted, as in the case of unsaturated polyesters which are to be cross-linked, and store the resulting mixtures until needed for use.

The molecular weights of the polyesters produced according to the present invention range from that of the reaction product of one dicarboxy compound molecule with one oxide molecule and one alcohol molecule generally around 200 but depending of course on the individual reactants to more than 10,000.

As stated above, the products produced in accordance with the present invention may be beneficially used for a variety of purposes, including use in the preparation of alkyd type resins and most applications where commercial polyesters are currently being used, but giving products with superior fire and chemical resistance. They range from liquids to rubbery elastomers to hard, strong plastics. These products can be used for a variety of purposes in such diversified fields as adhesives, coatings, and the like. Otherwise the products may be used to impart beneficial characteristics to alkyd resins, in coating compositions and laminates of various types, and the like. Ethylenically unsaturated polyesters can be cross-linked with various ethylenically unsaturated cross-linking agents to yield materials useful in a wide variety of applications including flexible and rigid coatings, elastomers, rubbers, soft to hard plastics, etc., all having a high degree of nonflammability and chemical resistance and, in many cases, even being nonburning. The physical properties of these polyester materials may be upgraded by the addition according to well-known procedures of some auxiliary natural or synthetic material such as glass fibers, asbestos, sisal, cotton, polyamide and polyester-fibers, wood and pigment fillers, etc. to give reinforced plastics and laminates of superior strength and a high degree of nonflammability.

Further, especially if ethylenically unsaturated, the polyesters may be mixed with certain drying oils such as linseed oil and perilla oil and coated on a surface to undergo oxidative cross-linking or polymerization and give tough, elastic, weather and chemical resistant air-drying films which have improved fire resistance. Additional uses and modifications of the stated uses will be readily apparent to one skilled in the art.

The polyesters of this invention can be further reacted with isocyanates or inorganic or organic acid chlorides to yield modified polychloroesters characterized by improved heat distortion temperature of the styrenated, cured polyester, improved chemical and solvent resistance of the styrenated, cured polyester, and improved nonburning characteristics of the styrenated, cured polyester when phosphorous or antimony are chemically incorporated.

The compounds suitable for this purpose include dicarboxylic acid dichlorides, for example, terephthaloylchloride, isophthaloylchloride, adipoylchloride, oxalylchloride; phosgene; phosphorus chlorides and phosphoryl chlorides, for example, phosphorus trichloride, phenylphonous dichloride, phosphorus oxychloride, phenylphosphonic dichloride; antimony trichloride; diisocyanates, such as tolylene diisocyanates, xylene diisocyanates, diphenylmethane diisocyanates, triisocyanates, such as triphenylmethane triisocyanates or isocyanates with higher functionality such as polyaryl polyisocyanates.

The portions of the acid chlorides or isocyanates to the polyester may be varied over a substantial range and the preferred range in an individual case depends on a number of factors including the intended use of the ultimate product, the properties desired, the exact reactants employed, etc. In general, it is preferred to employ an amount of acid chloride or isocyanate that is equivalent to the hydroxyl content of the polychloroester. From the above description it is seen that the product of the present invention is a polyester of (1) At least one organic dicarboxylic acid anhydride,
(2) At least one vicinal alkylene oxide selected from the group consisting of (a) an alkylene oxide containing from 2 to 18 carbon atoms inclusive, selected from the group consisting of saturated alkylene oxides and alkylene oxides which are free from other than aromatic unsaturation, and (b) an alkylene oxide as defined in (a) but containing from 3 to 4 carbon atoms and at least 1 halogen atom, each halogen having an atomic weight of 19 to 80 inclusive and having from 1 to 3 alkyl groups attached to at least 1 carbon atom of the oxirane ring, said alkyl groups having up to 2 carbon atoms, and
(3) a halogenated monofunctional alcohol having the following general formula:

$$C_nH_{2n+1-z}Y_zOH$$

wherein $n$ is an integer of from 1 to 11, $z$ is an integer from 1 to 23, and Y is a halogen having an atomic weight of 19 to 80 inclusive, and the reaction product of I, the above described polyester, and II, a compound selected from the group consisting of isocyanates and inorganic and organic acid chlorides.

The process of the present invention is accordingly a process for preparing a polyester comprising heating and reacting (1) at least one organic dicarboxylic acid anhydride,
(2) at least one vicinal alkylene oxide selected from the group consisting of (a) an alkylene oxide containing from 2 to 18 carbon atoms inclusive, selected from the group consisting of saturated alkylene oxides and alkylene oxides which are free from other than aromatic unsaturation, and (b) an alkylene oxide as defined in (a) but containing from 3 to 4 carbon atoms and at least 1 halogen atom, each halogen having an atomic weight of 19 to 80 inclusive and having from 1 to 2 alkyl groups attached to at least 1 carbon atom of the oxirane ring, said alkyl groups having up to 2 carbon atoms, and
(3) a halogenated monofunctional alcohol having the following general formula:

$$C_nH_{2n+1-z}Y_zOH$$

wherein $n$ is an integer of from 1 to 11, $z$ is an integer from 1 to 23, and Y is a halogen having an atomic weight of 19 to 80 inclusive in the presence of a reaction catalyst and a process for preparing a novel resin comprising adding a compound selected from the group consisting of isocyanates and inorganic and organic acid chlorides to the above polyester.

The practice of this invention will be more completely understood by reference to the following examples:

EXAMPLE 1

In a 0.5-liter round-bottom flask equipped with a heating mantle, mechanical stirrer, thermometer, and a water-cooled condenser, 64 grams (0.4 mol) 3,3,3-trichloropropylene oxide, 39.2 grams (0.4 mol) maleic anhydride, 0.8 gram aluminum isopropoxide and 10.9 grams (0.067 mol), 1,1,1-trichloro-2-propanol were charged and the mixture slowly heated. After applying the heat to initiate the reaction, slight cooling by means of a water bath was employed to maintain the reaction temperature at 150° C. The reaction was continued for 1 hour. A hard solid was obtained exhibiting a Gardner color of 10 and a molecular weight of 1370 (determined ebullioscopically).

EXAMPLE 2

In a 1-liter round-bottom flask equipped with a mechanical stirrer, thermometer, and a water-cooled condenser and provided with a heating mantle, 322 grams (2 mols) of 3,3,3-trichloropropylene oxide, 196 grams (2 mols) of maleic anhydride, 2 grams of aluminum chloride and 54.5 grams (0.335 mol) of 1,1,1-trichloro-2-propanol were charged and the mixture heated to 150° C. at which temperature it was maintained by intermittent cooling with a water bath. The reaction mixture was maintained at this temperature for 1 hour. A hard solid was obtained exhibiting a Gardner color of 12 and having a molecular weight of 1870 (determined ebullioscopically). No unreacted volatiles remained, thus indicating complete conversion to polymeric material.

EXAMPLE 3

In a 0.5-liter round-bottom flask equipped with a mechanical stirrer, thermometer, water-cooled condenser, and heating mantle, 64 grams (0.4 mol) 3,3,3-trichloropropylene oxide, 39.2 grams (0.4 mol) maleic anhydride, 9.92 grams (0.066 mol) 2,2,2-trichloroethanol, and 0.4 gram aluminum chloride were charged and the mixture heated. The mixture was allowed to exotherm to a temperature of 150–160° C. at which temperature range it was maintained by cooling in a cooling bath for 1½ hours. A hard, brown solid was obtained exhibiting a Gardner color of 18.

EXAMPLE 4

In a 1-liter round-bottom flask equipped with a mechanical stirrer, thermometer, heating mantle, and a water-cooled condenser, 322 grams (2 mols) 3,3,3-trichloropropylene oxide, 196 grams (2 mols) maleic anhydride, 28.6 grams (0.222 mol) of 1,3-dichloroisopropanol, and 19.0 grams (0.117 mol) of 1,1,3-trichloropropanol and 4.0 grams of aluminum triisopropoxide were charged and the mixture heated. The mixture was permitted to exotherm to the temperature of 130–140° C. at which temperature it was maintained by cooling in a cooling bath for 1½ hours. After 1½ hours' reaction time, no unreacted volatiles remained, thus indicating complete conversion to polymeric material. A hard, amber solid was obtained exhibiting a Gardner color of 10, a molecular weight of 1060 (determined ebullioscopically), hydroxyl content of 1.3 percent, 43.7 percent chlorine content and an acid number of less than 6.

EXAMPLE 5

In a 1-liter round-bottom flask equipped with a mechanical stirrer, thermometer, heating mantle, and a water-cooled condenser, 322 grams (2 mols) of 3,3,3-trichloropropylene oxide, 147 grams (1.5 mols) of maleic anhydride, 74 grams (0.5 mol) of phthalic anhydride, 54 grams (0.33 mol) of 1,1,1-trichloroisopropanol, and 4.0 grams of aluminum triisopropoxide were charged and the mixture heated to initiate the reaction. The mixture was then allowed to exotherm to a temperature of 130–140° C. at which temperature it was maintained by cooling in a cooling bath for 1½ hours. After completion of the recation the mixture was stripped of 1 gram of volatiles in vacuum at 140° C. A hard, amber solid was obtained exhibiting a Gardner color of 10, a molecular weight of 1230 (determined ebullioscopically), a hydroxyl content of 1.36 percent, 42.6 percent chlorine content and an acid number of 6.2.

EXAMPLE 6

In a 1-liter round-bottom flask equipped with a mechanical stirrer, thermometer, heating mantle, and a water-cooled condenser, 322 grams (2 mols) of 3,3,3-trichloropropylene oxide, 196 grams (2 mols) of maleic anhydride, 155 grams (0.67 mol) of 1,1,1,3,3-pentachloroisopropanol, and 4.0 grams of aluminum triisopropoxide were charged and the mixture initially heated. After initial heating the mixture was allowed to exotherm to a temperature of 130–140° C. where it was maintained by cooling for 50 minutes. Upon completion of the reaction 4 grams of volatiles were stripped from the reacted mixture at 120° C. in vacuum. An amber, nontacky product was obtained which was brittle on impact but which flows slowly at room temperature. The material exhibited a Gardner color of 10, a molecular weight of 925 (determined ebullioscopically), a hydroxyl content of 1.9 percent, a chlorine content of 48.3 percent, and an acid number of 3.1.

EXAMPLE 7

*Aluminum phthalate preparation*

In a 1-liter round-bottom flask, 49.8 grams (0.3 mol) of phthalic acid and 61.2 grams (0.3 mol) of aluminum isopropoxide were dissolved in 500 milliliters of anhydrous isopropanol. The solvent was stripped at 15 millimeters of mercury on a steam bath. After all the solvent had been removed, the product contained 20.4 percent aluminum oxide as determined by ignition.

*Polyester preparation*

In a 1-liter round-bottom flask equipped with a mechanical stirrer, thermometer, heating mantle, and a water-cooled condenser, 322 grams (2 mols) of 3,3,3-trichloropropylene oxide, 196 grams (2 mols) of maleic anhydride, 155 grams (0.67 mol) of 1,1,1,3,3-pentachloroisopropanol were mechanically stirred and initially heated to 130–140° C. at which temperature it was maintained by cooling in a cooling bath. 0.7 gram of the above aluminum phthalate was then added in 7 increments over a period of 3 hours. After 1 additional hour at 130° C., only traces of volatiles could be removed at 135° C. in vacuum from the reacted mixture. An amber, non-tacky product was obtained. The material exhibited a Gardner color of 10, a molecular weight of 810 (determined ebullioscopically), a hydroxyl content of 1.7 percent, a chlorine content of 48.8 percent, and an acid number of 5.7.

EXAMPLE 8

In a 1-liter round bottom flask equipped with a mechanical stirrer, thermometer, heating mantle, and a water-cooled condenser, 322 grams (2 mols) of 3,3,3-trichloropropylene oxide, 196 grams (2 mols) of maleic anhydride, and 93 grams (0.4 mol) of 1,1,1,3,3-pentachloroisopropanol were stirred at 130–140° C. and 0.7 gram aluminum phthalate, prepared as described in Example 7, was added in 7 increments over a period of 2 hours. After 3 additional hours stirring at 130–140° C., the reaction was terminated, following which 16 grams of volatiles were removed at 135° C. in vacuum. An amber solid was obtained exhibiting a Gardner color of 12, a molecular weight of 1190 (determined ebullioscopically), a hydroxyl content of 1.2 percent, a chlorine content of 46.4 percent, and an acid number of 3.5.

EXAMPLE 9

In a 1-liter round-bottom flask equipped with a mechanical stirrer, thermometer, heating mantle, and a water-cooled condenser, 322 grams (2 mols) of 3,3,3-trichloropropylene oxide, 196 grams (2 mols) of maleic anhydride, and 57.7 grams (0.25 mol) of 1,1,1,3,3-pentachloroisopropanol were charged and initially heated. The mixture was allowed to exotherm to a temperature of 130–140° C. at which it was maintained by cooling in a cooling bath and 0.7 gram of aluminum phthalate, prepared as described in Example 7, was added in 7 increments over a period of 2 hours. The reaction mixture was maintained at this temperature and stirred for an additional 3½ hours, after which the reaction was terminated. One gram of volatiles was removed from the reacted mixture at 130° C. in a vacuum. An amber solid was obtained exhibiting a Gardner color of 14, a molecular weight of 1830 (determined ebullioscopically) a hydroxyl content of 0.8 percent, a chlorine content of 44.4 percent, and an acid number of 3.6.

EXAMPLE 10

In a 1-liter round-bottom flask equipped with a mechanical stirrer, thermometer, heating mantle, and a water-cooled condenser, 161 grams (1 mol) of 3,3,3-trichloropropylene oxide, 58 grams (1 mol) of propylene oxide, 196 grams (2 mols) of maleic anhydride, 155 grams (0.67 mol) of 1,1,1,3,3-pentachloroisopropanol, and 4.0 grams of aluminum triisopropoxide were charged and the mixture initially heated. The mixture was allowed to exotherm to a temperature of 130–140° C. at which temperature it was maintained by cooling for 1 hour. Heavy reflux could be observed during the first 5 minutes. Upon completion of the reaction, the reaction mixture was stripped of 1 gram of volatiles in a vacuum. A brown, heavy viscous liquid, which barely flows at room temperature, was obtained exhibiting a Gardner color of 14, a molecular weight of 730 (determined ebullioscopically), a hydroxyl content of 1.7 percent, a chlorine content of 39.7 percent, and an acid number of 17.

EXAMPLE 11

In a 1-liter round-bottom flask equipped with a mechanical stirrer, thermometer, heating mantle, and a water-cooled reflux condenser, 483 grams (3 mols) of 3,3,3-trichloropropylene oxide, 176 grams (1.8 mols) of maleic anhydride, 46.2 grams (0.2 mol) of 1,1,1,3,3-pentachloroisopropanol, and 6.0 grams of aluminum triisopropoxide were charged and the mixture initially heated to a temperature of 110° C. The temperature was then permitted to rise to 140° C. and the reaction mixture kept for an additional hour at 130–140° C. After completion of the reaction, the mixture was stripped of its volatiles at 140–115° C. in a vacuum for 30 minutes. 54 grams of voltailes were removed from the reacted mixture. A brown solid was obtained exhibiting a Gardner color of 14, a molecular weight of 1560 (determined ebullioscopically), and having a chlorine content of 48.4 percent.

EXAMPLE 12

In a 1-liter round-bottom flask equipped with a mechanical stirrer, thermometer and a water-cooled condenser, 322 grams (2 mols) of 1,1,1-trichloropropylene oxide, 196 grams (2 mols) of maleic anhydride, 4.0 grams of aluminum isopropoxide, and 77 grams (0.33 mol) of 1,1,1,3,3-pentachloroisopropanol were charged and the mixture heated to a temperature of 130–140° C., after which the source of heat was removed. A temperature of 130–140° C. was maintained by cooling in a water bath. The temperature was so maintained for 30 minutes, after which the same temperature was maintained for an other 30 minutes with the aid of a heating mantle. A hard solid was obtained exhibiting a Gardner color of 12 and a molecular weight of 1415 (determined ebullioscopically). No unreacted volatiles remained, thus indicating a complete conversion to polymeric material.

EXAMPLE 13

In a 1-liter round-bottom flask equipped with a mechanical stirrer, thermometer, a water-cooled condenser and provided with a heating mantle, 258 grams (1.6 mols) of 3,3,3-trichloropropylene oxide, 23.2 grams (0.4 mol)

of propylene oxide, 196 grams (2 mols) of maleic anhydride, 4.0 grams of aluminum isopropoxide, and 155 grams (0.67 mol) of 1,1,1,3,3-pentachloroisopropanol were charged and this mixture heated to 70° C. where the exothermic reaction began. The temperature then rose to 130° C. without heating and a temperature of 130–140° C. was maintained by cooling in a water bath for 20 minutes, after which the cooling was no longer necessary. The reaction was continued for a total time of 1½ hours. A heavy, viscous liquid at room temperature was obtained exhibiting a Gardner color of 13 and a molecular weight of 722 (determined ebullioscopically).

EXAMPLE 14

In a 1-liter round-bottom, three-necked flask equipped with a mechanical stirrer, thermometer and a reflux condenser, 185 grams (2 mols) of epichlorohydrin, 196 grams (2 mols) of maleic anhydride, 77 grams (0.33 mol) of 1,1,1,3,3-pentachloroisopropanol and 4 grams of aluminum isopropoxide were charged and the mixture heated to 140° C. The temperature of 140° C. was maintained for 30 minutes by cooling with a water bath, after which the temperature was continued to be maintained at 140° C. with a heating mantle for a total reaction time of 2½ hours. A self-fusing solid at room temperature was obtained exhibiting a Gardner color of 12. Only a minor amount of unreacted volatiles remained.

EXAMPLE 15

350 grams (2 mols) of 4,4,4-trichloro-1,2-epoxy-butane, 196 grams (2 mols) of maleic anhydride, 77 grams (0.33 mol) of 1,1,1,3,3-pentachloroisopropanol, and 4.0 grams of aluminum isopropoxide are reacted in the manner described in Example 12, producing a semisolid polyester resin, which when cross-linked with styrene yields a non-burning, hard resin.

EXAMPLE 16

161 grams (1 mol) of 3,3,3-trichloropropylene oxide, 72 grams (1 mol) of 1,2-butylene oxide, 196 grams (2 mols) of maleic anhydride, 155 grams (0.67 mol) of 1,1,1,3,3-pentachloroisopropanol, and 4.0 grams of aluminum isopropoxide are reacted in the manner described in Example 12 above. A semisolid polyester resin is obtained, which after cross-linking with styrene yields a fire-resistant, hard resin.

EXAMPLE 17

322 grams (2 mols) of 3,3,3-trichloropropylene oxide, 100 grams (1 mol) of succinic anhydride, 112 grams (1 mol) of citraconic anhydride, 77 grams (0.33 mol) of 1,1,1,3,3-pentachloroisopropanol, and 4.0 grams of aluminum isopropoxide are reacted to produce a solid polyester resin, which after cross-linking with styrene yields a fire-resistant, hard resin.

EXAMPLE 18

322 grams (2 mols) of 3,3,3-trichloropropylene oxide, 224 grams (2 mols) citraconic anhydride, 77 grams (0.33 mol) of 1,1,1,3,3-pentachloroisopropanol, and 4.0 grams of aluminum isopropoxide are reacted in the manner described in Example 12 above to produce a solid polyester resin, which after cross-linking with styrene yields a non-burning, hard resin.

EXAMPLE 19

In a 1-liter round-bottom flask equipped with a mechanical stirrer, thermometer, heating mantle, and a water-cooled condenser, 322 grams of 3,3,3-trichloropropylene oxide (2 mols), 196 grams of maleic anhydride (2 mols), and 155 grams of 1,1,1,3,3-pentachloroisopropanol (0.67 mol), and 0.7 gram of aluminum phthalate were charged, stirred and heated to 140° C., which temperature was maintained for 6 hours. To the viscous reaction product at 140° C., 61.2 grams (0.3 mol) of adipoylchloride were added and stirred one additional hour a 200° C. During this time 23 grams of HCl evolved from the reaction mixture indicating a quantitative conversion of the adipoylchloride. The final material contained only trace amounts of volatiles and exhibited a Gardner color of 13.

EXAMPLE 20

A polyester was prepared exactly as described in Example 19 with the exception that in lieu of the adipoylchloride 30.5 grams (0.222 mol) of phosphorus trichloride was added and stirred one additional hour at 200° C. During this period 17.5 grams of HCl evolved from the reaction mixture indicating a 72 percent conversion of the phosphorus trichloride. No volatiles were found in the final product which exhibited a Gardner color of 10.

EXAMPLE 21

A polyester prepared exactly as described in Example 19 with the exception that in lieu of the adipoylchloride 58.2 grams (0.33 mol) tolylene diisocyanate and 0.67 grams, i.e. 0.1 weight percent, of stannous octoate catalyst were added after allowing the reaction mixture to cool down to 110° C. The temperature of the stirred reaction mixture rose to 145° C. within 5 minutes and was kept at 140° C. for 30 minutes. 6.5 grams of volatiles were removed under a 1 mm. Hg vacuum and the final product exhibited a Gardner color of 12.

It is to be understood that various changes and modifications may be made in the foregoing composition and process without departing from the spirit of the invention and scope of the appended claims.

What is claimed is:
1. A polyester of
    (1) at least one organic dicarboxylic acid anhydride,
    (2) at least one vicinal alkylene oxide selected from the group consisting of
        (a) an alkylene oxide containing from 2 to 18 carbon atoms inclusive, selected from the group consisting of saturated alkylene oxides and alkylene oxides which are free from other than aromatic unsaturation, and
        (b) an alkylene oxide as defined in (a) but containing from 3 to 4 carbon atoms and at least 1 halogen atom, each halogen having an atomic weight of 19 to 80 inclusive and having from 1 to 2 alkyl groups attached to at least 1 carbon atom of the oxirane ring, said alkyl groups having up to 2 carbon atoms, and
    (3) a halogenated monofunctional alcohol having the following general formula:

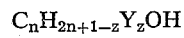

$$C_nH_{2n+1-z}Y_zOH$$

wherein $n$ is an integer of from 1 to 11, $z$ is an integer from 1 to 23, and Y is a halogen having an atomic weight of 19 to 80 inclusive.
2. The polyester of claim 1 wherein said organic dicarboxylic acid anhydride and said vicinal alkylene oxide are in a molar ratio of about 1:1 to about 1:6 and said halogenated monofunctional alcohol and said dicarboxylic acid anhydride are in a molar ratio of about 1:1 to 1:50.
3. The polyester of claim 2 wherein said halogenated monofunctional alcohol and said dicarboxylic acid anhydride are in a molar ratio of about 1:2 to 1:12.
4. The polyester of claim 2 wherein said vicinal alkylene oxide is a 3,3,3-trihalopropylene oxide.
5. The polyester of claim 2 wherein the halogenated monofunctional alcohol is a 1,1,1,3,3-pentahaloisopropanol.
6. The polyester of claim 2 wherein the vicinal alkylene oxide is a 3,3,3-trihalopropylene oxide and the halogenated monofunctional alcohol is a 1,1,1,3,3-pentahaloisopropanol.
7. A polyester of maleic anhydride, 3,3,3-trichloropropylene oxide, and 1,1,1,3,3-pentachloroisopropanol.

8. A polyester of maleic anhydride, 3,3,3,-trichloropropylene oxide, propylene oxide, and 1,1,1,3,3-pentachloroisopropanol.

9. A polyester of maleic anhydride, 3,3,3-trichloropropylene oxide, 1,2-butylene oxide, and 1,1,1,3,3-pentachloroisopropanol.

10. A polyester of maleic anhydride, 4,4,4-trichloro-1,2-epoxy butane, and 1,1,1,3,3-pentachloroisopropanol.

11. A polyester of maleic anhydride, epichlorohydrin, and 1,1,1,3,3-pentachloroisopropanol.

12. A polyester of maleic anhydride, phthalic anhydride, 3,3,3-trichloropropylene oxide, and 1,1,1,3,3-pentachloroisopropanol.

13. A polyester of maleic anhydride, phthalic anhydride, 3,3,3-trichloropropylene oxide, and 1,1,1-trichloro-2-propanol.

14. A polyester of citraconic anhydride, 3,3,3-trichloropropylene oxide, and 1,1,1,3,3-pentachloroisopropanol.

15. A polyester of succinic anhydride, citraconic anhydride, 3,3,3-trichloropropylene oxide, and 1,1,1,3,3-pentachloroisopropanol.

16. A polyester of maleic anhydride, 3,3,3-trichloropropylene oxide, and 1,1,1-trichloro-2-propanol.

17. A polyester of maleic anhydride, 3,3,3-trichloropropylene oxide, and 2,2,2-trichloroethanol.

18. A polyester of maleic anhydride, 3,3,3-trichloropropylene oxide, 1,1,3-trichloroisopropanol, and 1,3-dichloroisopropanol.

19. A process for preparing a polyester comprising heating and reacting
  (1) at least one organic dicarboxylic acid anhydride,
  (2) at least one vicinal alkylene oxide selected from the group consisting of
    (a) an alkylene oxide containing from 2 to 18 carbon atoms inclusive, selected from the group consisting of saturated alkylene oxides and alkylene oxides which are free from other than aromatic unsaturation, and
    (b) an alkylene oxide as defined in (a) but containing from 3 to 4 carbon atoms and at least 1 halogen atom, each halogen having an atomic weight of 19 to 80 inclusive and having from 1 to 2 alkyl groups attached to at least 1 carbon atom of the oxirane ring, said alkyl groups having up to 2 carbon atoms, and
  (3) a halogenated monofunctional alcohol having the following general formula:

$$C_nH_{2n+1-z}Y_zOH$$

wherein $n$ is an integer of from 1 to 11, $z$ is an integer from 1 to 23, and Y is a halogen having an atomic weight of 19 to 80 inclusive in the presence of a reaction catalyst.

20. The process of claim 19 wherein said organic dicarboxylic acid anhydride and vicinal alkylene oxide are reacted in a molar ratio of about 1:1 to about 1:6, said halogenated monofunctional alcohol and said dicarboxylic acid anhydride are reacted in a molar ratio of about 1:1 to 1:50 and the amount of said catalyst is from about 0.01 to 10 percent by weight of the total mixture.

21. The process of claim 20 wherein the halogenated monofunctional alcohol and the dicarboxylic acid anhydride are reacted in a molar ratio of about 1:2 to 1:12 and said catalyst is present in an amount of about 0.1 to 0.5 percent of the total ingredients.

22. The process for preparing a polyester of claim 20 wherein the vicinal alkylene oxide is a 3,3,3-trihalopropylene oxide.

23. The process for preparing a polyester of claim 20 wherein the halogenated monofunctional alcohol is a 1,1,1,3,3-pentahaloisopropanol.

24. The process for preparing a polyester of claim 20 wherein the alkylene oxide is a 3,3,3-trihalopropylene oxide and the halogenated monofunctional alcohol is 1,1,1,3,3-pentahaloisopropanol.

25. The process of claim 20 wherein the reaction catalyst is aluminum isopropoxide.

26. The process of claim 20 wherein the reaction catalyst is aluminum chloride.

27. The process of claim 20, wherein the reaction catalyst is aluminum phthalate.

28. The process for preparing a polyester comprising reacting maleic anhydride, 3,3,3-trichloropropylene oxide, and 1,1,1,3,3-pentachloroisopropanol in the presence of a reaction catalyst.

29. The process for preparing a polyester comprising reacting maleic anhydride, 3,3,3-trichloropropylene oxide, propylene oxide, and 1,1,1,3,3-pentachloroisopropanol in the presence of a reaction catalyst.

30. The process for preparing a polyester comprising reacting maleic anhydride, 3,3,3-trichloropropylene oxide, 1,2-butylene oxide, and 1,1,1,3,3-pentachloroisopropanol in the presence of a reaction catalyst.

31. The process for preparing a polyester comprising reacting maleic anhydride, 4,4,4-trichloro-1,2-epoxy butylene, and 1,1,1,3,3-pentachloroisopropanol in the presence of a reaction catalyst.

32. The process for preparing a polyester comprising reacting maleic anhydride, epichlorohydrin, and 1,1,1,3,3-pentachloroisopropanol in the presence of a reaction catalyst.

33. The process for preparing a polyester comprising reacting maleic anhydride, phthalic anhydride, 3,3,3-trichloropropylene oxide, and 1,1,1,3,3-pentachloroisopropanol in the presence of a reaction catalyst.

34. The process for preparing a polyester comprising reacting maleic anhydride, phthalic anhydride, 3,3,3-trichloropropylene oxide, and 1,1,1-trichloro-2-propanol in the presence of a reaction catalyst.

35. The process for preparing a polyester comprising reacting citraconic anhydride, 3,3,3-trichloropropylene oxide, and 1,1,1,3,3-pentachloroisopropanol in the presence of a reaction catalyst.

36. The process for preparing a polyester comprising reacting succinic anhydride, citraconic anhydride, 3,3,3-trichloropropylene oxide, and 1,1,1,3,3-pentachloroisopropanol in the presence of a reaction catalyst.

37. The process for preparing a polyester comprising reacting maleic anhydride, 3,3,3-trichloropropylene oxide, and 1,1,1-trichloro-2-propanol in the presence of a reaction catalyst.

38. The process for preparing a polyester comprising reacting maleic anhydride, 3,3,3-trichloropropylene oxide, and 2,2,2-trichloroethanol in the presence of a reaction catalyst.

39. The process for preparing a polyester comprising reacting maleic anhydride, 3,3,3-trichloropropylene oxide, 1,1,3-trichloroisopropanol, and 1,3-dichloroisopropanol in the presence of a reaction catalyst.

40. A polyester having a molecular weight between about 200 and 10,000, having a structure depicted by the following formula:

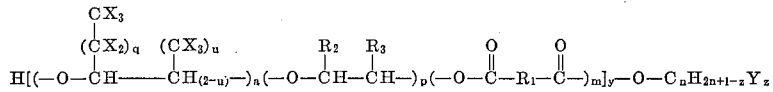

wherein $R_1$ is the residue of the dibasic anhydride, $R_2$ and $R_3$ are aliphatic or aromatic radicals or hydrogen, Y is a halogen, X is hydrogen or halogen, $q$ and $u$ are from 0 to 1, m is 1, y is an integer from 1 to 50 inclusive, n is an integer from 1 to 11 inclusive, z is an integer from 1 to 23 inclusive, and a and p are selected from 0, 1, 2 and 3.

41. The reaction product of
I. a polyester of
  (1) at least one organic dicarboxylic acid anhydride,
  (2) at least one vicinal alkylene oxide selected from the group consisting of
     (a) an alkylene oxide containing from 2 to 18 carbon atoms inclusive, selected from the group consisting of saturated alkylene oxides and alkylene oxides which are free from other than aromatic unsaturation, and
     (b) an alkylene oxide as defined in (a) but containing from 3 to 4 carbon atoms and at least 1 halogen atom, each halogen having an atomic weight of 19 to 80 inclusive and having from 1 to 2 alkyl groups attached to at least 1 carbon atom of the oxirane ring, said alkyl groups having up to 2 carbon atoms, and
  (3) a halogenated monofunctional alcohol having the following general formula:

$$C_nH_{2n+1-z}Y_zOH$$

wherein $n$ is an integer of from 1 to 11, $z$ is an integer from 1 to 23, and Y is a halogen having an atomic weight of 19 to 80 inclusive, and
II. a compound selected from the group consisting of isocyanates, and inorganic and organic acid chlorides.

42. The reaction product of claim 41 wherein said compound II is adipoylchloride.

43. The reaction product of claim 41 wherein said compound II is phosphorous trichloride.

44. The reaction product of claim 41 wherein said compound II is tolylene diisocyanate.

45. The product of claim 41 wherein said organic dicarboxylic acid anhydride and said vicinal alkylene oxide are in a molar ratio of about 1:1 to about 1:6, said halogenated monofunctional alcohol and said dicarboxylic acid anhydride are in a molar ratio of about 1:1 to 1:50, and said compound II is added in an amount equivalent to the OH— content of compound I.

46. The reaction product of
I. a polyester of
  (1) maleic anhydride,
  (2) a 3,3,3-trihalopropylene oxide, and
  (3) a 1,1,1,3,3-pentahaloisopropanol, and
II. adipoylchloride.

47. The reaction product of
I. a polyester of
  (1) maleic anhydride,
  (2) a 3,3,3-trihalopropylene oxide, and
  (3) a 1,1,1,3,3-pentahaloisopropanol, and
II. phosphorous trichloride.

48. The reaction product of
I. a polyester of
  (1) maleic anhydride,
  (2) a 3,3,3-trihalopropylene oxide, and
  (3) a 1,1,1,3,3-pentahaloisopropanol, and
II. tolylene diisocyanate.

49. A process for preparing a novel resin comprising adding a compound selected from the group consisting of isocyanates and inorganic and organic acid chlorides to a polyester of
  (1) at least one organic dicarboxylic acid anhydride,
  (2) at least one vicinal alkylene oxide selected from the group consisting of
     (a) an alkylene oxide containing from 2 to 18 carbon atoms inclusive, selected from the group consisting of saturated alkylene oxides and alkylene oxides which are free from other than aromatic unsaturation, and
     (b) an alkylene oxide as defined in (a) but containing from 3 to 4 carbon atoms and at least 1 halogen atom, each halogen having an atomic weight of 19 to 80 inclusive and having from 1 to 2 alkyl groups attached to at least 1 carbon atom of the oxirane ring, said alkyl groups having up to 2 carbon atoms, and
  (3) a halogenated monofunctional alcohol having the following general formula:

$$C_nH_{2n+1-z}Y_zOH$$

wherein $n$ is an integer of from 1 to 11, $z$ is an integer from 1 to 23, and Y is a halogen having an atomic weight of 19 to 80 inclusive, at a temperature sufficient to maintain said polyester above the solidification point.

50. The process of claim 49 wherein adipoylchloride is added to said polyester.

51. The process of claim 49 wherein phosphorous trichloride is added to the polyester.

52. The process of claim 49 wherein tolylene diisocyanate is added to said polyester.

53. The process of claim 49 wherein said organic dicarboxylic acid anhydride and said vicinal alkylene oxide are in a molar ratio of about 1:1 to about 1:6, said halogenated monofunctional alcohol and said dicarboxylic acid anhydride are in a molar ratio of about 1:1 to 1:50 and the said compound selected from the group consisting of isocyanates and inorganic and organic acid chlorides is employed in an amount equivalent to the OH— content of the polyester.

54. A process for preparing a novel resin comprising adding adipoylchloride to a polyester of
  (1) maleic anhydride,
  (2) a 3,3,3-trihalopropylene oxide, and
  (3) a 1,1,1,3,3-pentahaloisopropanol, at a temperature sufficient to maintain said polyester above the solidification point.

55. A process for preparing a novel resin comprising adding phosphorous trichloride to a polyester of
  (1) maleic anhydride,
  (2) a 3,3,3-trihalopropylene oxide, and
  (3) a 1,1,1,3,3-pentahaloisopropanol, at a temperature sufficient to maintain said polyester above the solidification point.

56. A process for preparing a novel resin comprising adding tolylene diisocyanate to a polyester of
  (1) maleic anhydride,
  (2) a 3,3,3-trihalopropylene oxide, and
  (3) a 1,1,1,3,3-pentahaloisopropanol, at a temperature sufficient to maintain said polyester above the solidification point.

No references cited.

MURRAY TILLMAN, *Primary Examiner.*

J. T. GOOLKASIAN, *Assistant Examiner.*